June 30, 1970     G. R. COHEN     3,517,402
METHOD OF MAKING BOLTS
Original Filed Dec. 20, 1967
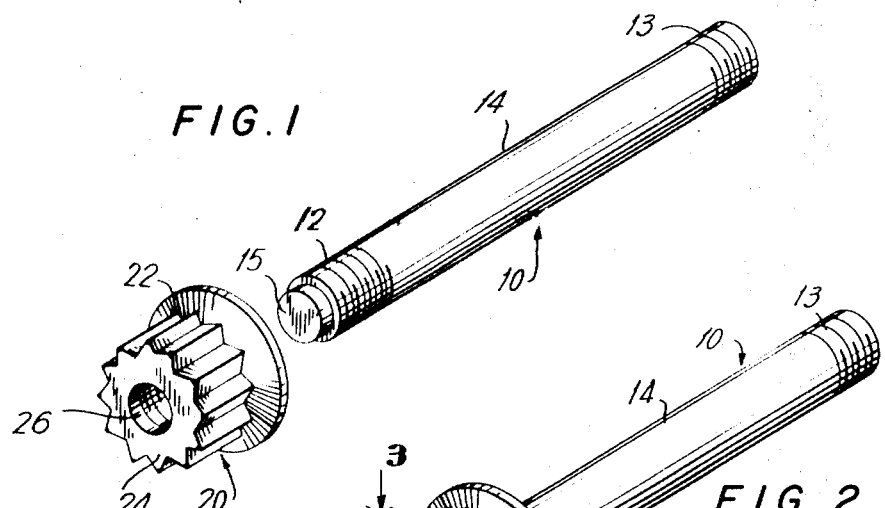
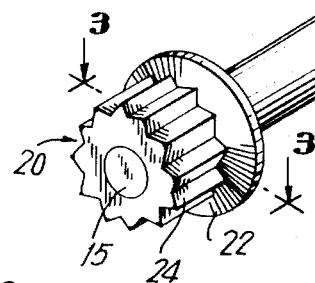
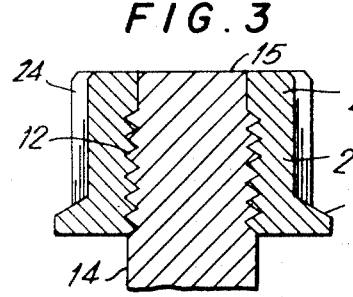
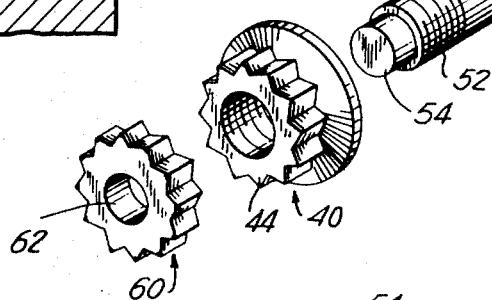
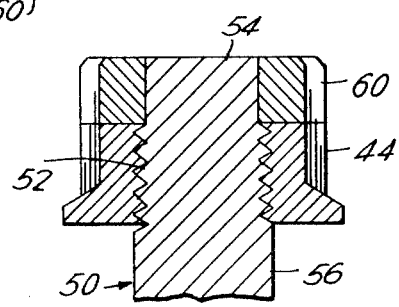
INVENTOR.
GEORGE R. COHEN
ATTORNEY : 3,517,402
Patented June 30, 1970

3,517,402
METHOD OF MAKING BOLTS
George R. Cohen, Cambridge, Mass., assignor to Standard Pressed Steel Co., Jenkintown, Pa., a corporation of Pennsylvania
Original application Dec. 20, 1967, Ser. No. 692,128, now Patent No. 3,440,922. Divided and this application Feb. 3, 1969, Ser. No. 828,025
Int. Cl. B21k 1/44
U.S. Cl. 10—27      2 Claims

ABSTRACT OF THE DISCLOSURE

A bolt formed by turning a threaded section of a stud into a head unit having a partially threaded bore. The threaded section of the stud is spaced from one end of the stud by an unthreaded section which is arranged to be in tightly fitted engagement with the unthreaded portion of the bore of the head unit, whereby the head unit and the stud are joined together rigidly. The stud is fabricated from an alloy which develops high-strength properties either by the combination of mechanical-working and heat treatment or by mechanical-working alone.

---

This application is a division of application Ser. No. 692,128 filed Dec. 20, 1967, now Pat. No. 3,440,922.

The present invention relates, in general, to fasteners and, in particular, to the fabrication of high-strength bolts especially useful in aircraft, missile and space applications.

Because of the severe requirements of the high-speed, heavier aircraft presently in use or being developed, much time and effort is being devoted to the development of new fastening devices and materials from which these devices may be fabricated. The high-temperature ranges, sonic vibration levels and loads to which these aircraft are subjected has resulted in the use of such high-strength materials as A286 Stainless Steel, Waspalloy, 300 Series Stainless Steels, alloy steels and other similar alloys in the fabrication of fasteners for these aircraft.

A characteristic of these alloys is that their strength is increased significantly if they are subjected to a combination of mechanical-working and heat treatment or mechanical-working alone. Mechanical-working as used herein involves the plastic deformation of a material as, for example, by a reduction in cross-sectional area through extrusion, drawing or rolling. Typical of the results achieved at the present time are ½" to ⅝" bolts having tensile strengths in excess of 200 K p.s.i.

Generally, the fabrication of these mechanically-worked bolts by conventional techniques is limited by the size of presently available forging equipment and by various handling and process control difficulties. For example, as these alloys are mechanically-worked, they harden and it becomes more difficult to continue the mechanical-working to complete the formation of configuration details such as wrenching surfaces. This adds to the size and power requirements of the equipment to be employed. In addition, the dies used to form the bolts must be able to withstand the extremely high forces developed during the bolt forming operation. In other cases, in order to achieve the desired results of mechanical-working some of these alloys are mechanically-worked while they are in a condition which, from the fabrication standpoint, is not conducive to the formation of configuration details. Various problems in handling the material and controlling the processing are encountered. As a result, presently available equipment and techniques generally do not permit efficient and practical fabrication of bolts from these mechanically-worked alloys.

Accordingly, it is an object of the present invention to provide new and improved high-strength bolts which may be fabricated in an efficient and practical manner from alloys which develop high-strength properties either by the combination of mechanical-working and heat treatment or by mechanical-working alone.

It is another object of the present invention to provide a method of fabricating high-strength bolts from these alloys through the use of conventional, presently available bolt-making equipment.

These objects, as well as others, are achieved according to the present invention by providing a stud having a threaded section spaced from one end of the stud by an unthreaded section and a head unit having a partially threaded bore turned onto the threaded section of the stud to form a bolt. The unthreaded portion of the bore of the head unit is arranged to be in tightly fitted engagement with the unthreaded section of the stud, whereby torque forces applied to the head unit are transmitted to the stud. The stud is formed from a mechanically-worked alloy. As used herein, a "mechanically-worked alloy" refers to that class of alloys which develop high-strength properties either by the combination of mechanical-working and heat treatment or by mechanical-working alone.

For a better understanding of the present invention, together with other and further objects thereof, reference is made to the following description, taken in connection with the accompanying drawing, and its scope will be pointed out in the appended claims.

Referring to the drawing:

FIG. 1 is an exploded perspective view of the component parts of a first embodiment of a bolt constructed in accordance with the present invention prior to the assembly of the bolt;

FIG. 2 is a perspective view of the first embodiment of a bolt constructed in accordance with the present invention after assembly;

FIG. 3 is a sectional view taken along line 3—3 of FIG. 2;

FIG. 4 is an exploded perspective view of the component parts of a second embodiment of a bolt constructed in accordance with the present invention prior to assembly of the bolt; and FIG. 5 is a sectional view of the head portion of the second embodiment of a bolt constructed in accordance with the present invention after assembly.

Referring to FIGS. 1, 2 and 3, a bolt constructed in accordance with the present invention includes a stud 10 and a head unit 20 adapted to receive the stud. Stud 10 is provided with externally threaded sections 12 and 13 at its opposite ends which are separated by a first unthreaded section 14. Threaded section 12 is spaced from one end of the stud by a second unthreaded section 15.

Head unit 20, in the form of a nut, is composed of a flange section 22 and a splined section 24. The bore 26 of nut 20 is partially threaded. In particular, as most clearly illustrated in FIG. 3, bore 26 of nut 20 is threaded along a first selected length, designated generally by reference numeral 27, and has an unthreaded section extending for a second selected length, designated generally by reference numeral 28.

Stud 10 and nut 20 are made of a mechanically-worked alloy such as A286 Stainless Steel. Each of these parts is mechanically-worked by conventional equipment to the general configuration illustrated except for the thread rolling operations. After mechanical-working, stud 10 and nut 20 are heat treated. A typical heat treating temperature range for A286 Stainless Steel is 1200°–1400° F. Such temperatures do not destroy the effects of mechanical-working. After heat treatment, the threads of sections 12 and 13 are rolled on stud 10 and bore 26 of nut 20 is tapped or internally thread rolled along the selected length 27. The rolling operations provide further mechanical-working of the components.

Threaded sections 12 and 27 and unthreaded sections 15 and 28 are arranged so that upon assembly of the bolt, threaded section 12 of the stud will be in threaded engagement with threaded section 27 of the nut and unthreaded section 15 of the stud wall be in tightly fitted engagement with unthreaded section 28 of the nut. Because of the tightly fitted engagement of unthreaded section 15 within the unthreaded portion 28 of the bore, with the bolt in use, torque forces applied to the head of the bolt (nut 20) are transmitted to the shank of the bolt (stud 10). In order to provide maximum tension and fatigue strength characteristics to the bolt and to minimize problems in assembling the bolt, the axial extent of the tight fit beween unthreaded section 15 and 28 preferably is limited to a length sufficient to transmit the expected torque forces for the particular application of the bolt.

The bolt illustrated in FIG. 2 is assembled by subjecting unthreaded section 28 of nut 20 and unthreaded section 15 of stud 10 to differential heating whereby sufficient clearance is provided between the surfaces which are arranged for tightly fitted engagement. This may be effected by heating nut 20 or cooling stud 10 or by a combination of the two. While this condition exists, nut 30 is turned onto threaded section 12 of stud 10 so that unthreaded section 15 of stud 10 is positioned within unthreaded section 28 of nut 20. After assembly of the bolt, nut 20 or stud 10, depending upon the mode of differential heating, returns to its initial temperature and tends toward resuming its initial shape and dimensions. Because unthreaded sections 15 and 28 have been arranged for tightly fitted engagement, stud 10 and nut 20 now are secured tightly together.

Among the factors which are taken into consideration in the selection of dimensions for the stud and nut are changes in thread dimensions, both in the axial and radial directions, which take place as the stud and nut are subjected to differential heating. The thread dimensions are so selected and the differential heating is so controlled that while the relationship between sections 15 and 28 is altered to permit section 15 to fit within section 28, threaded sections 12 and 27 which are arranged for normal threaded engagement are not altered to an extent which prevents turning the nut onto the stud. The need for dimensional criticality is reduced as the effects of differential heating are confined to those sectors over which the tightly fitted engagement is intended.

It should be noted that in heating nut 20 to enlarge bore 26 the temperature to which the nut is raised does not destroy the effects of prior mechanical-working. Furthermore, the differential heating may be carried out by simultaneously heating nut 20 and cooling threaded section 12.

FIGS. 4 and 5 illustrate a second embodiment of a bolt constructed in accordance with the present invention. This embodiment differs from the one illustrated in FIGS. 1, 2 and 3 in that the head unit includes a nut 40 in threaded engagement with threaded section 52 of stud 50 and a collar 60 in tightly fitted engagement with unthreaded section 54 of the stud. In this embodiment of the invention, nut 40 is turned onto threaded section 52 of stud 50. Then collar 60 is heated so that its bore 62 is enlarged and the collar may be slipped over unthreaded section 54. Collar 60 is positioned so that its lower end face is adjacent the upper end face of nut 40 with the splined wrenching surfaces of the collar aligned with the splined section 44 of the nut. Then, collar 60 returns to its initial temperature and is in tightly fitted engagement with unthreaded section 54.

An advantage of the embodiment of the invention illustrated in FIG. 4 is that section 52 and nut 40 need not be exposed to heating which would alter their thread dimensions. As a result, assembly of the bolt is relatively simple.

Although in the embodiments of the invention described above, all the parts of the bolt are made of the same mechanically-worked alloy, different compatible alloys may be employed in practice. In addition, in certain instances, it will be sufficient to fabricate only the stud from a mechanically-worked alloy. Again, the material chosen for the nut should be compatible with the stud material. The choice of materials is dependent upon the application.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A method of making screws, bolts or the like comprising:
   providing a head unit having a bore which is threaded along a first selected length thereof and which is unthreaded along a second selected length thereof;
   providing a stud fabricated from a mechanically-worked allow and having an externally threaded section spaced from one end of said stud by an unthreaded section, the threads of stud and said head unit arranged for threaded engagement and the crosssection of said second selected length of said bore being too small to receive said unthreaded section of said stud;
   subjecting said second selected length of said bore and said unthreaded section of said stud to differential heating to permit said unthreaded section of said stud to fit into said second selected length of said bore;
   and turning said threaded section of said stud in said first selected length of said bore and said unthreaded section of said stud into said second selected length of said bore.

2. A method of making screws, bolts or the like comprising:
   providing a stud fabricated from a mechanically-worked alloy and having an externally threaded section spaced from one end of said stud by an unthreaded section;
   providing a first head member having a threaded bore arranged for threaded engagement with said threaded section of said stud;
   providing a second head member having an unthreaded bore, the cross-section of said unthreaded bore being too small to receive said unthreaded section of said stud;
   turning said threaded section of said stud into said threaded bore of said first head member;
   subjecting said unthreaded section of said stud and said second head member to differential heating to permit said unthreaded section of said stud to fit into said unthreaded bore of said second head member;
   and slipping said unthreaded section of said stud into said unthreaded bore of said second head member.

References Cited

UNITED STATES PATENTS

| | | | |
|---|---|---|---|
| 156,722 | 11/1874 | Bates | 151—22 |
| 910,678 | 1/1909 | Hardin | 151—2 |
| 1,139,479 | 5/1915 | Brightman | 10—27 |
| 1,346,058 | 7/1920 | Robergel | 85—9 |
| 2,985,898 | 5/1961 | Goude | 10—27 |
| 3,298,725 | 1/1967 | Boteler | 85—1 |

RICHARD J. HERBST, Primary Examiner

E. M. COMBS, Assistant Examiner